United States Patent [19]
Simon

[11] Patent Number: 6,092,297
[45] Date of Patent: Jul. 25, 2000

[54] VIDEOCASSETTE TIME MEASUREMENT DEVICE

[76] Inventor: Paul E. Simon, 15 Mathies Hall, Hickham AFB, Hi. 96853

[21] Appl. No.: 09/030,617

[22] Filed: Feb. 27, 1998

[51] Int. Cl.⁷ ................................................. G01B 3/00
[52] U.S. Cl. .............................. 33/733; 33/494; 33/476; 206/387.1; 206/459.1
[58] Field of Search .............................. 33/733, 763, 1 B, 33/759

[56] References Cited

U.S. PATENT DOCUMENTS

| | | | |
|---|---|---|---|
| 2,239,222 | 4/1941 | Funke | 33/733 |
| 2,273,701 | 8/1942 | Funke | 33/733 |
| 2,330,909 | 8/1943 | Olson | 33/733 |
| 2,912,763 | 8/1959 | Loewe et al. | 33/733 |
| 2,946,127 | 1/1960 | Loewe | 33/733 |
| 3,407,781 | 10/1968 | Ardire et al. | 206/459.1 |
| 3,820,101 | 6/1974 | Bolick, Jr. . | |
| 4,501,359 | 2/1985 | Yoshizawa | 206/387.1 |
| 4,631,618 | 12/1986 | Ozawa et al. . | |
| 4,893,414 | 1/1990 | Samonek | 33/733 |
| 4,947,989 | 8/1990 | Horton . | |
| 5,310,996 | 5/1994 | Canal et al. | 235/78 R |
| 5,415,288 | 5/1995 | Ozaki . | |
| 5,673,489 | 10/1997 | Robell | 33/1 B |

FOREIGN PATENT DOCUMENTS

| | | | |
|---|---|---|---|
| 182721 A2 | 11/1985 | European Pat. Off. | 206/387.1 |
| 4123139 A1 | 7/1991 | European Pat. Off. | 206/387.1 |

*Primary Examiner*—Diego Gutierrez
*Assistant Examiner*—Maria Fernandez
*Attorney, Agent, or Firm*—Michael I. Kroll

[57] ABSTRACT

A videocassette time measurement device (10) comprising a structure (12) for housing a videocassette (14), so that the videocassette (14) can be freely inserted thereinto and taken out therefrom. A facility (16) is on the housing structure (12), for indicating the amount of time available and used on the tape (18) within the videocassette (14).

1 Claim, 8 Drawing Sheets

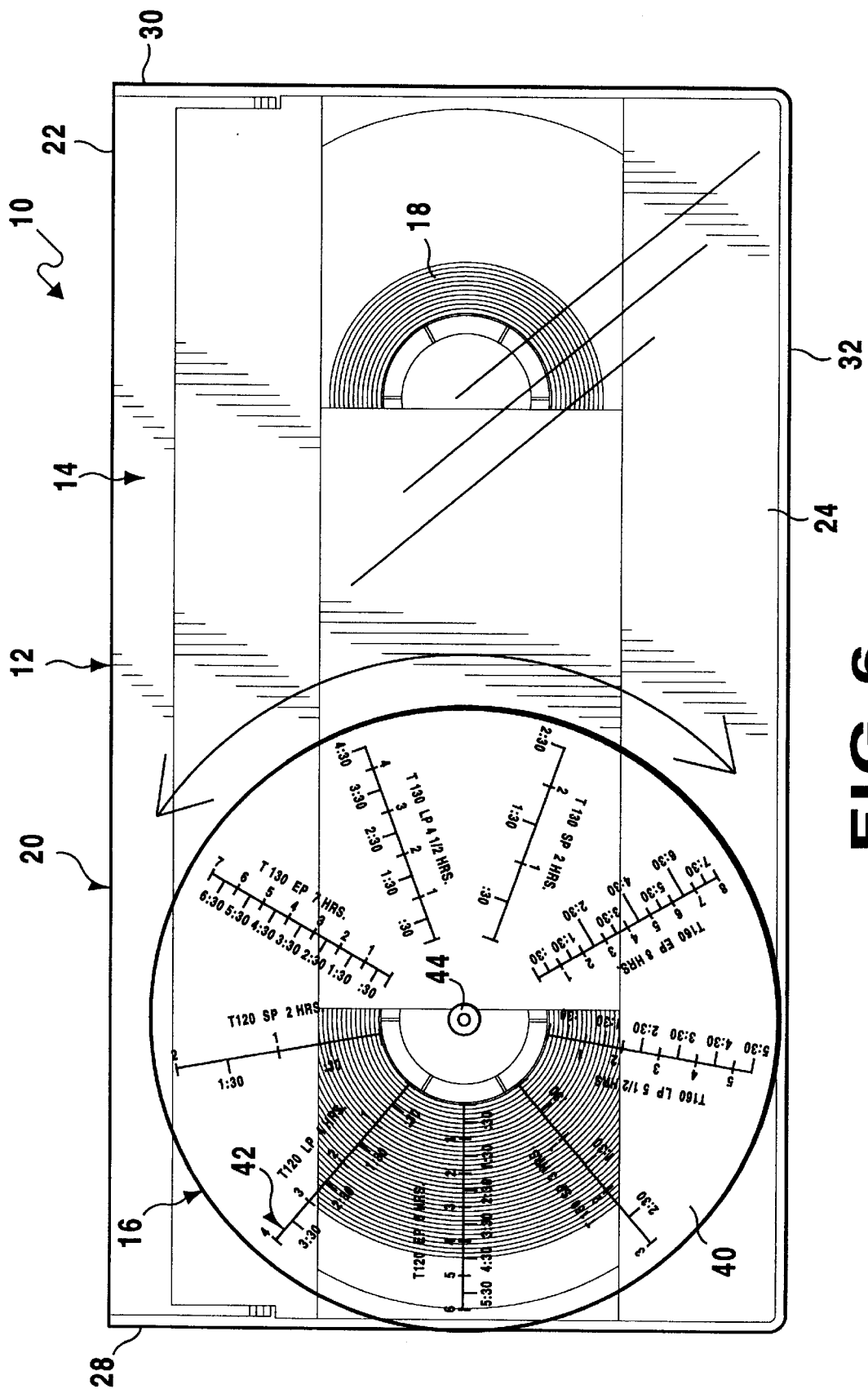

VIDEOCASSETTE TIME MEASUREMENT DEVICE

BACKGROUND OF THE INVENTION

1. Field of the Invention

The instant invention relates generally to tape cassettes and more specifically it relates to a videocassette time measurement device. The videocassette time measurement device consists of a transparent case with a time scale thereon. When a videocassette is inserted within the transparent case the time scale will indicate the amount of time available and used on the tape.

2. Description of the Prior Art

Numerous tape cassettes have been provided in prior art. For example, U.S. Pat. Nos. 3,820,101 to Bolick, Jr.; 4,631,618 to Ozawa et al.; 4,947,989 to Horton and 5,415,288 to Ozaki all are illustrative of such prior art. While these units may be suitable for the particular purpose to which they address, they would not be as suitable for the purposes of the present invention as heretofore described.

BOLICK, JR., FRED C.

Remaining Tape Sensing Apparatus

U.S. Pat. No. 3,820,101

Apparatus for use with a web feed apparatus such as a tape recorder, in which a supply of the web material wound on a spool is withdrawn from the spool for use, to provide an indication when only a predetermined amount of web remains on the spool. The present apparatus is responsive to the amount of tape remaining on the spool, and so an indication corresponding to the amount of remaining tape is made irrespective of the amount of tape initially on the spool. In one disclosed embodiment of the invention, a source of suitable radiation, such as illumination, and a radiation sensitive device are positioned on opposite sides of the tape spool at a predetermined distance from the axis of the spool, so that the radiation path remains interrupted by the tape on the spool until only a predetermined amount of tape remains on the spool. No mechanical or electrical interconnection with the tape transport mechanism is required. In another disclosed embodiment, the tape supply spool is connected to provide a signal having a parameter which is proportional to the speed at which the tape supply spool is rotated. A signal is provided in response to a parameter value corresponding to the supply spool rotational speed caused by a predetermined amount of remaining tape.

OZAWA, KAZUO and NOHOYAMA, HIDEKI

Tape Cassette with Protection Cover and Tape End Sensing Means

U.S. Pat. No. 4,631,618

A tape cassette with a tape beginning and tape end detecting mechanism is provided wherein a lid is pivotally supported by the cassette casing at its opposite sides to removably cover the front opening of the cassette casing. A sensor chip which forms an optical path is disposed inside and near each of the sides of the cassette casing and a first aperture is formed through each of the sides to expose a part of the sensor chip. A second aperture is formed through each of the sides of the lid. The first and second apertures are located such that when the lid is opened, the first and second apertures become coincident with one another in position, while when the lid is closed, the first and second apertures are displaced relative to one another, and the first aperture is covered by the lid to thereby protect the sensor chip.

HORTON, AZOR R.

Video Tape Box Advertising Showcase Cover Sleeve

U.S. Pat. No. 4,947,989

A video cassette storage container having a cover removably connected to a base portion. The cover is surrounded about its periphery by a series of lights that are programed to flash in an eye-catching fashion. The cover is designed to contain any suitable printed indicia such as a description of the contents of the storage container or an advertisement. The lights are included to draw attention to the printed indicia encased within the cover below a transparent sheet of material. In an alternate embodiment, the lights about the periphery of the cover are activated by touch.

OZAKI, HIROSHI

Videocassette Case Having Hard Plastic Sheets on Flat Surfaces Thereof

U.S. Pat. No. 5,415,288

A cassette case for housing a tape cassette so that the tape cassette can be freely inserted thereinto and taken out therefrom is comprised of a reinforcing sheet harder than the video cassette case laminated on the outer surface of the video cassette case.

SUMMARY OF THE INVENTION

A primary object of the present invention is to provide a videocassette time measurement device that will overcome the shortcomings of the prior art devices.

Another object is to provide a videocassette time measurement device that consists of a transparent case having a time scale thereon, so that when a videocassette is inserted within the transparent case the time scale will indicate the amount of time available and used on the tape.

An additional object is to provide a videocassette time measurement device that consists of a transparent case having a rotatable wheel with a time scale thereon, so that when the videocassette is inserted within the transparent case, the wheel can be rotated to the appropriate type of tape and desirable recording method, which will indicate the amount of time available and used on the tape.

A further object is to provide a videocassette time measurement device that is simple and easy to use.

A still further object is to provide a videocassette time measurement device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1A is a perspective view of the first embodiment per se.

FIG. 6 is a top plan view of a second embodiment of the present invention with a videocassette inserted therein.

Similar reference characters denote corresponding features consistently throughout the attached drawings.

DETAILED DESCRIPTION OF THE PREFERRED EMBODIMENTS

Figure 1:
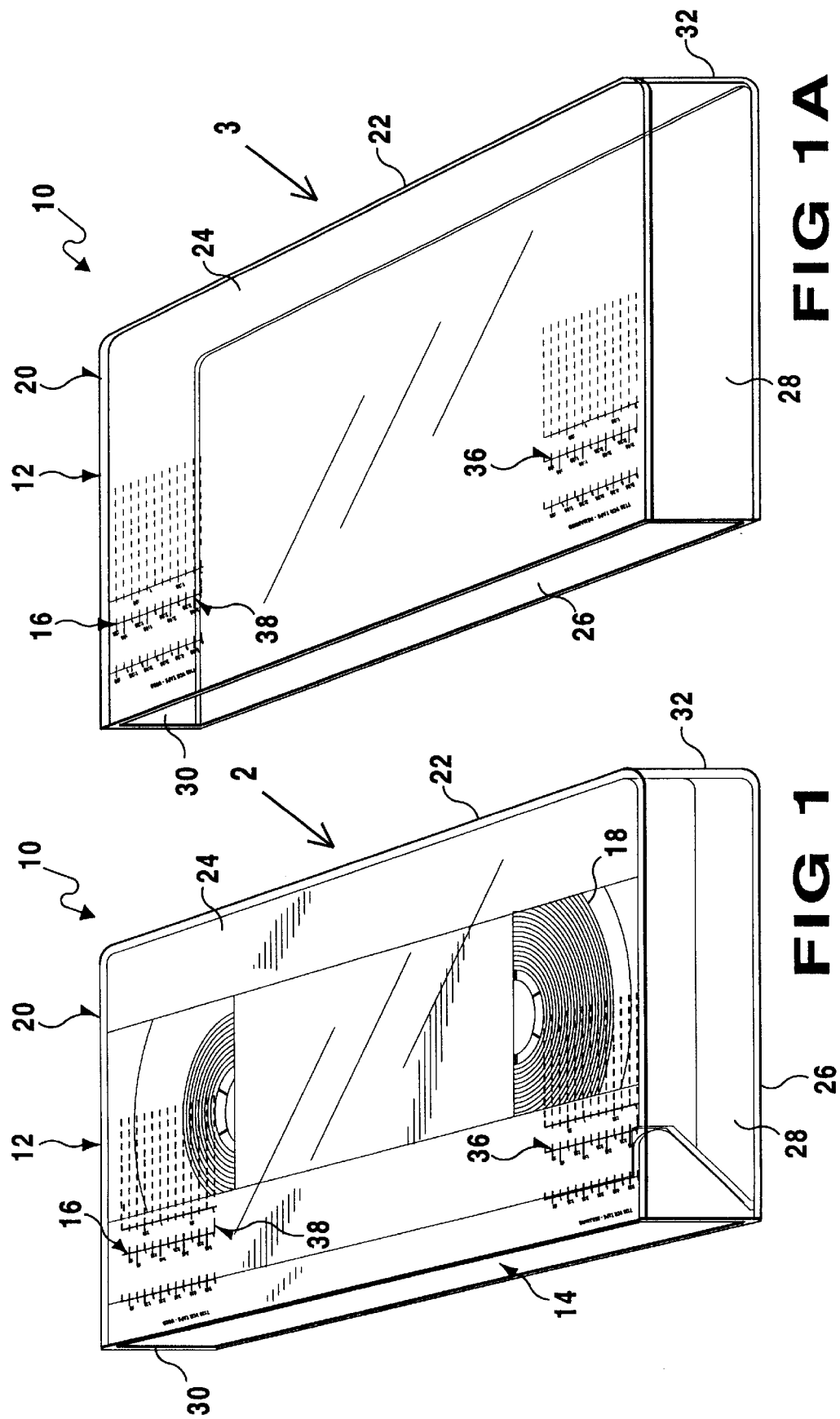
FIG. 1 is a perspective view of a first embodiment of the present invention with a videocassette inserted therein.
Figure 2:
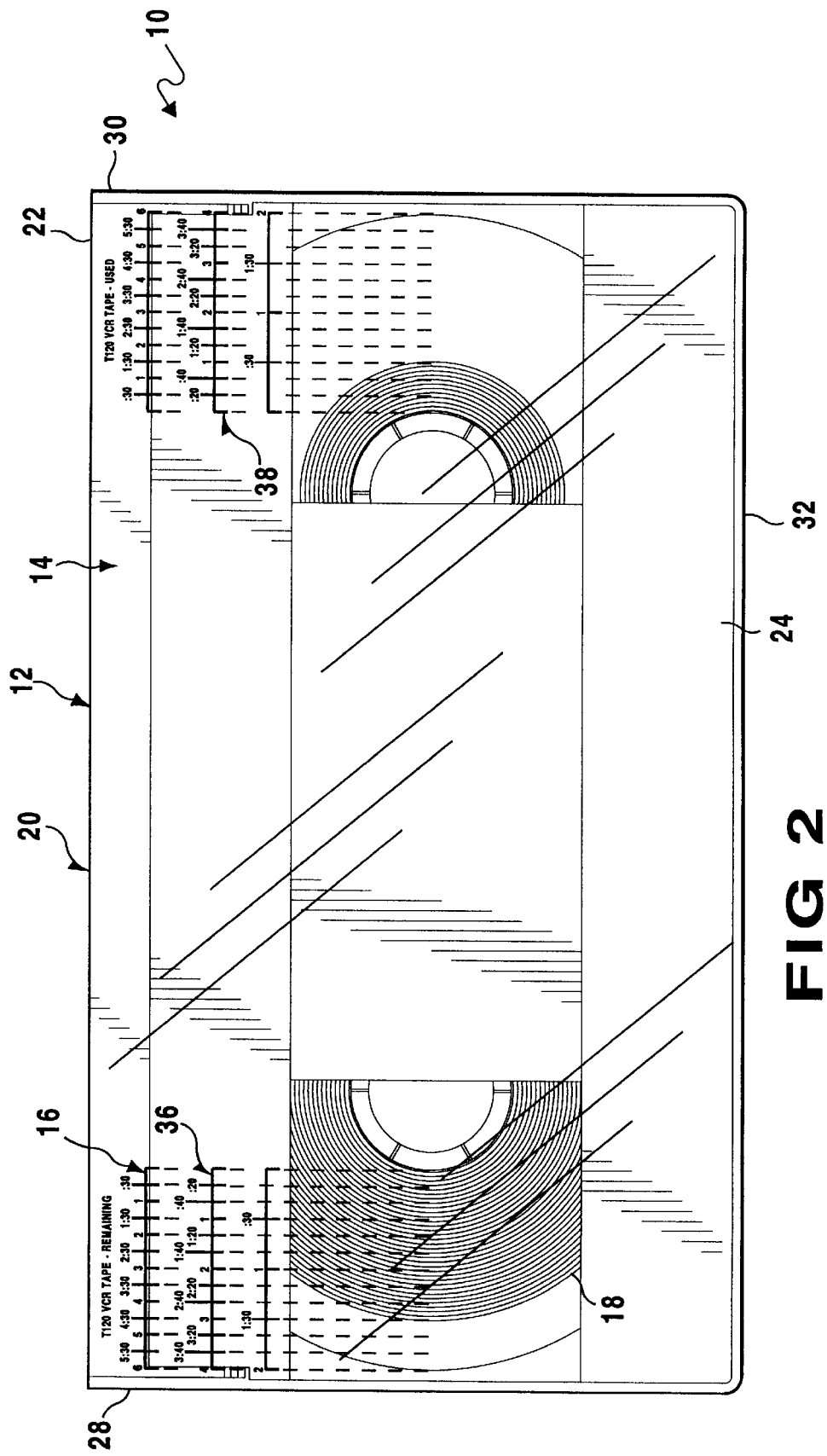
FIG. 2 is a top plan view taken in the direction of arrow 2 in FIG. 1.
Figure 3:
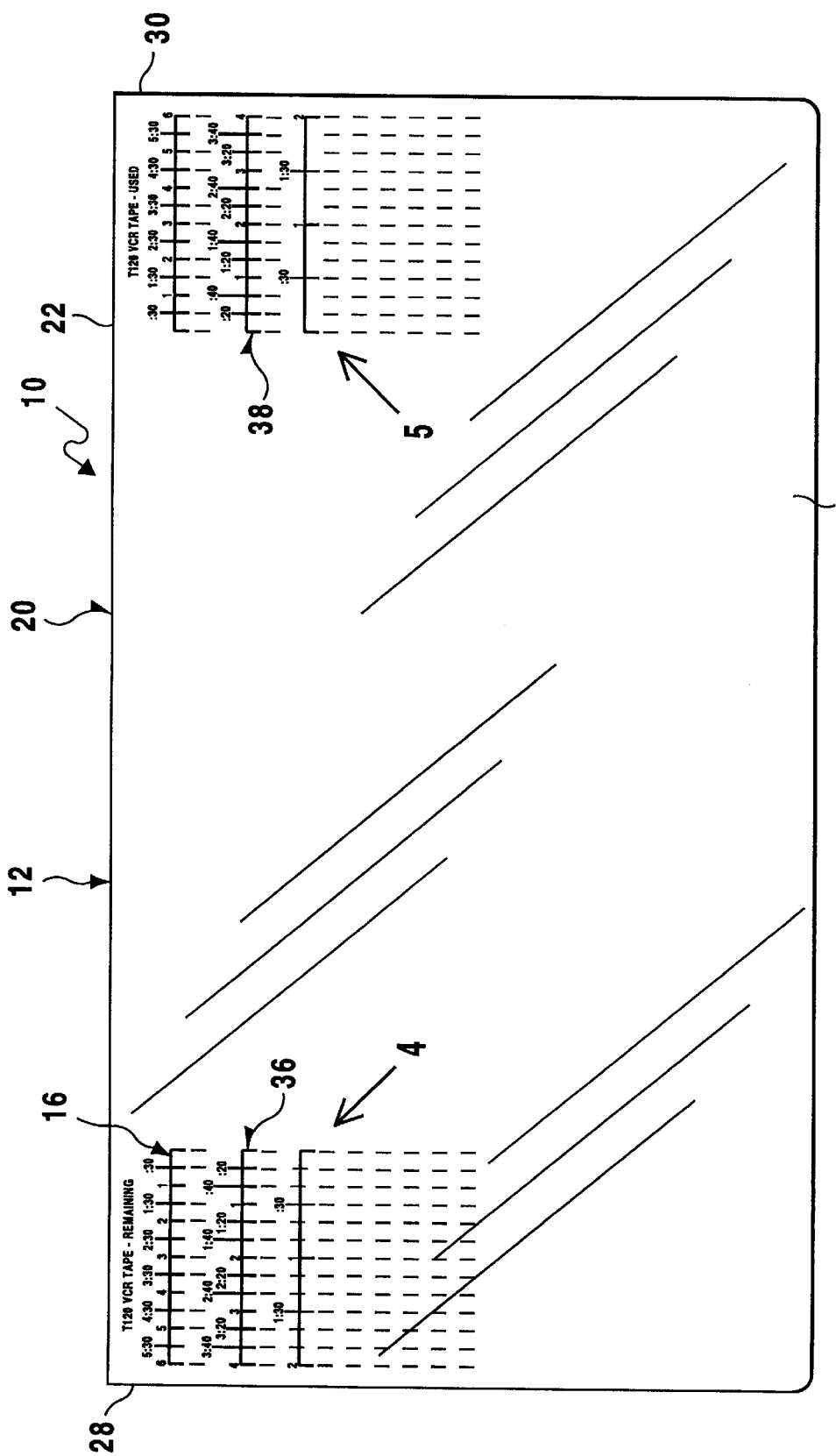
FIG. 3 is a top plan view taken in the direction of arrow 3 in FIG. 1A.
Figure 5:
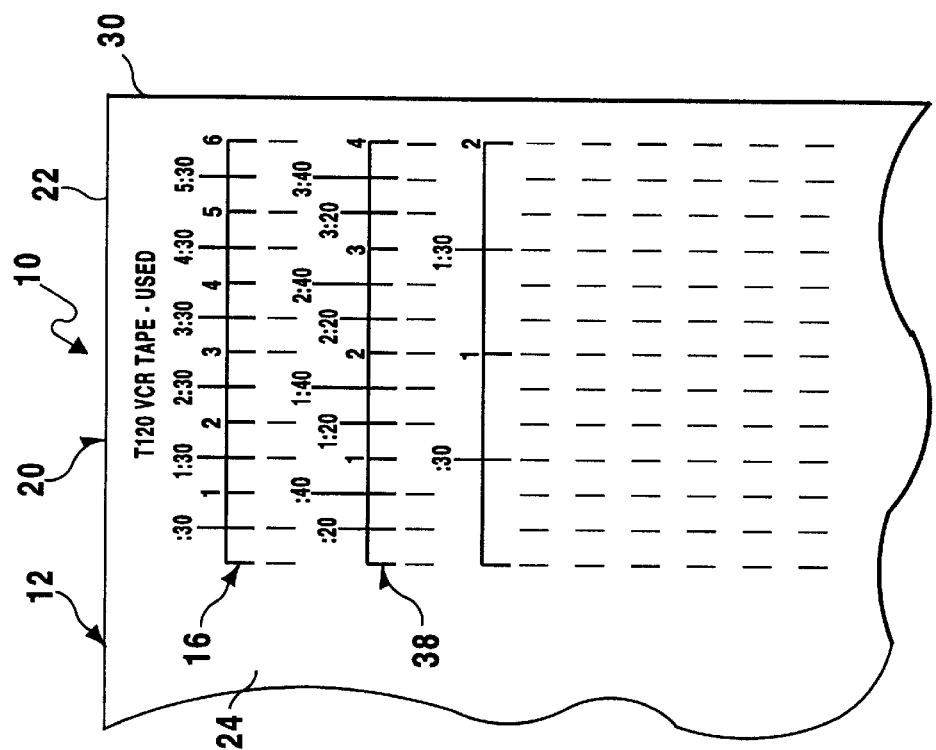
FIG. 5 is an enlarged top plan view of a portion of the first embodiment as indicated by arrow 5 in FIG. 3.
Figure 4:
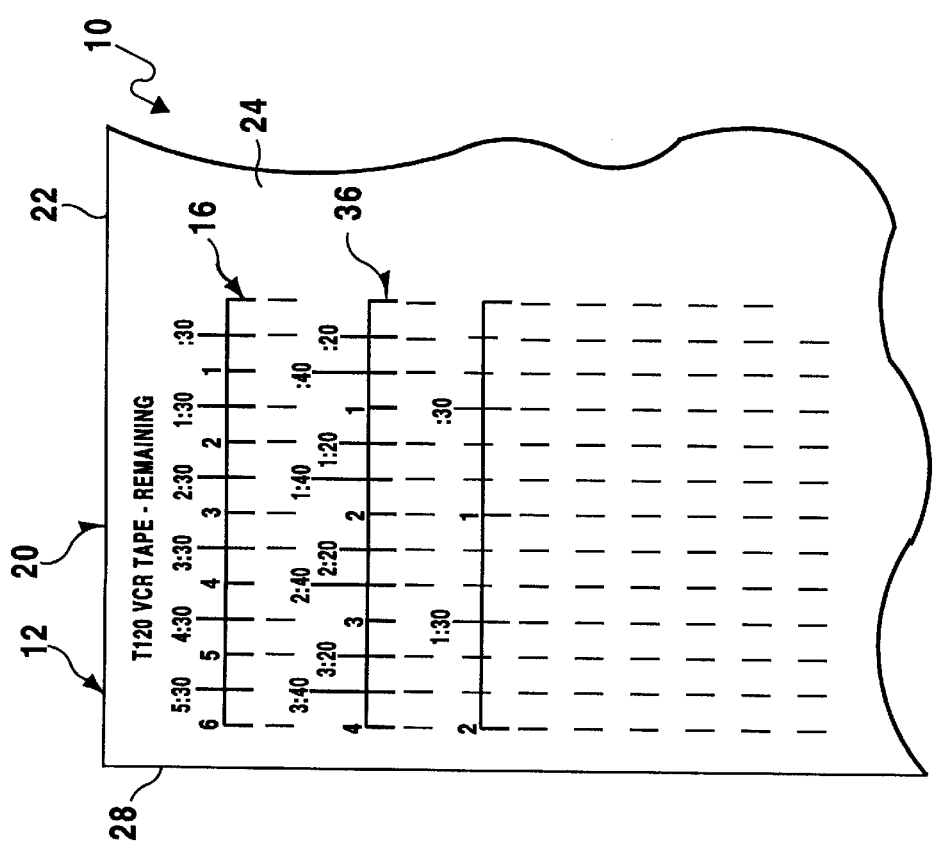
FIG. 4 is an enlarged top plan view of a portion of the first embodiment as indicated by arrow 4 in FIG. 3.
Figure 7:
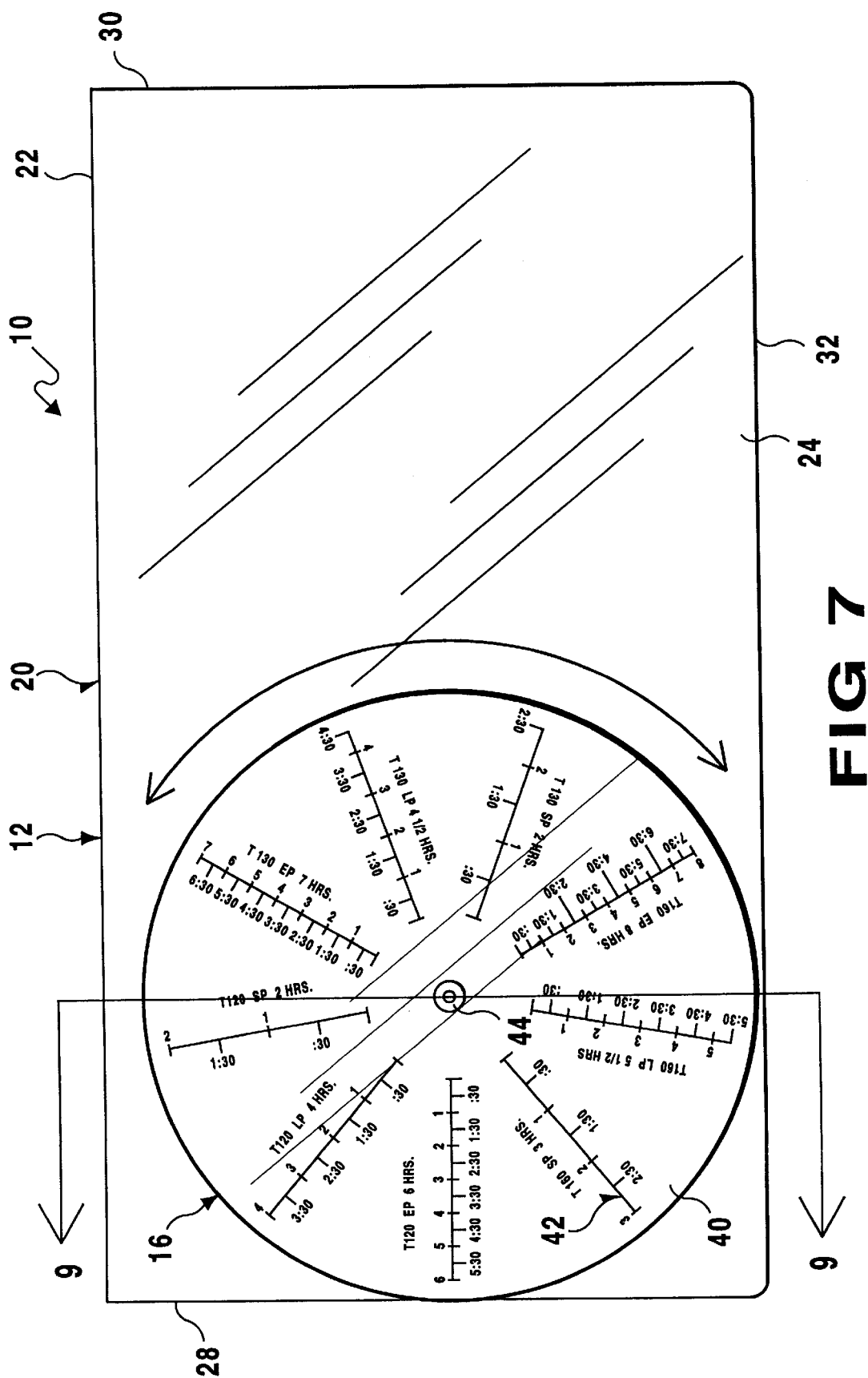
FIG. 7 is a top plan view of the second embodiment per se.
Figure 8:
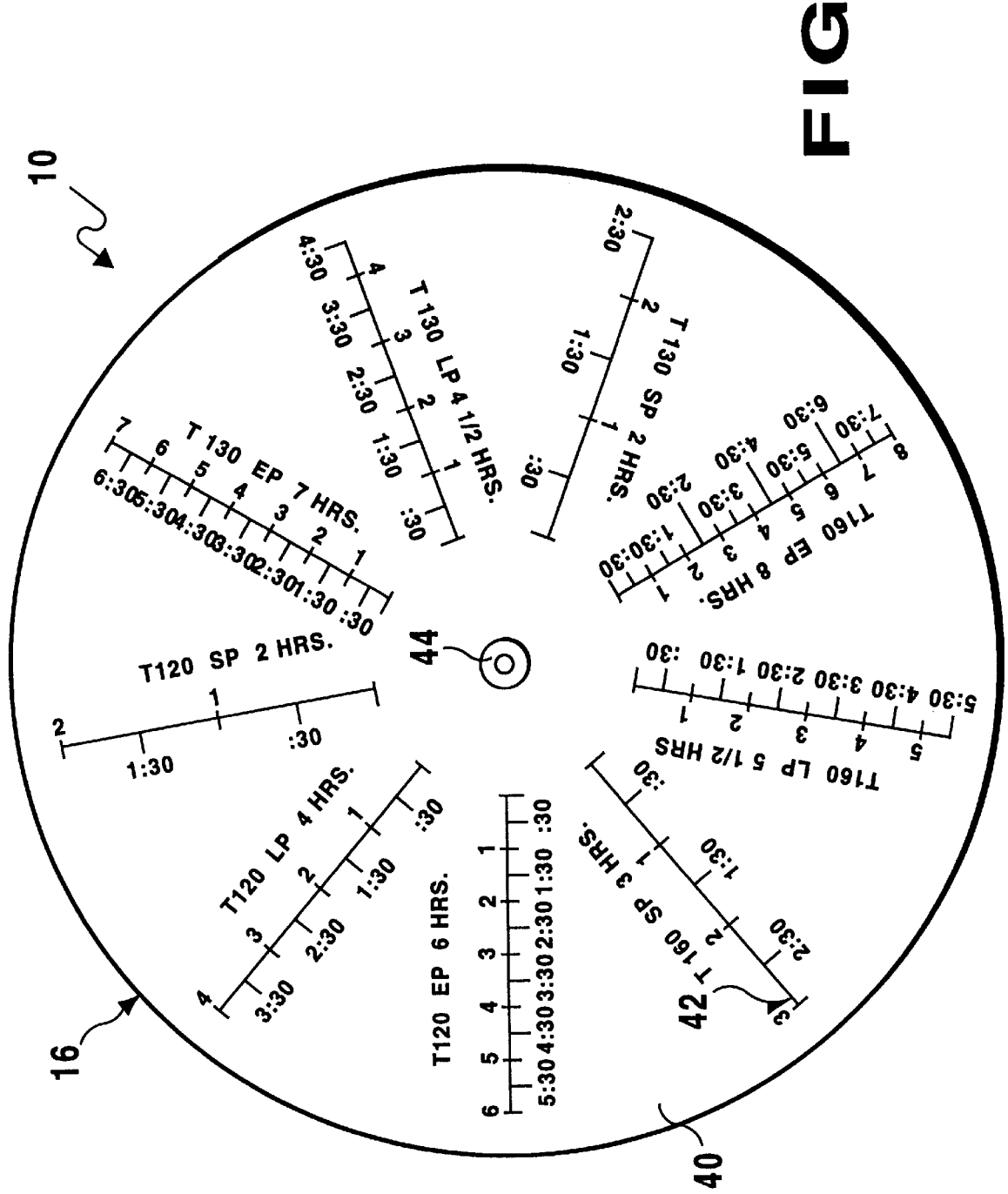
FIG. 8 is an enlarged top plan view of the wheel of the second embodiment.
Figure 9:
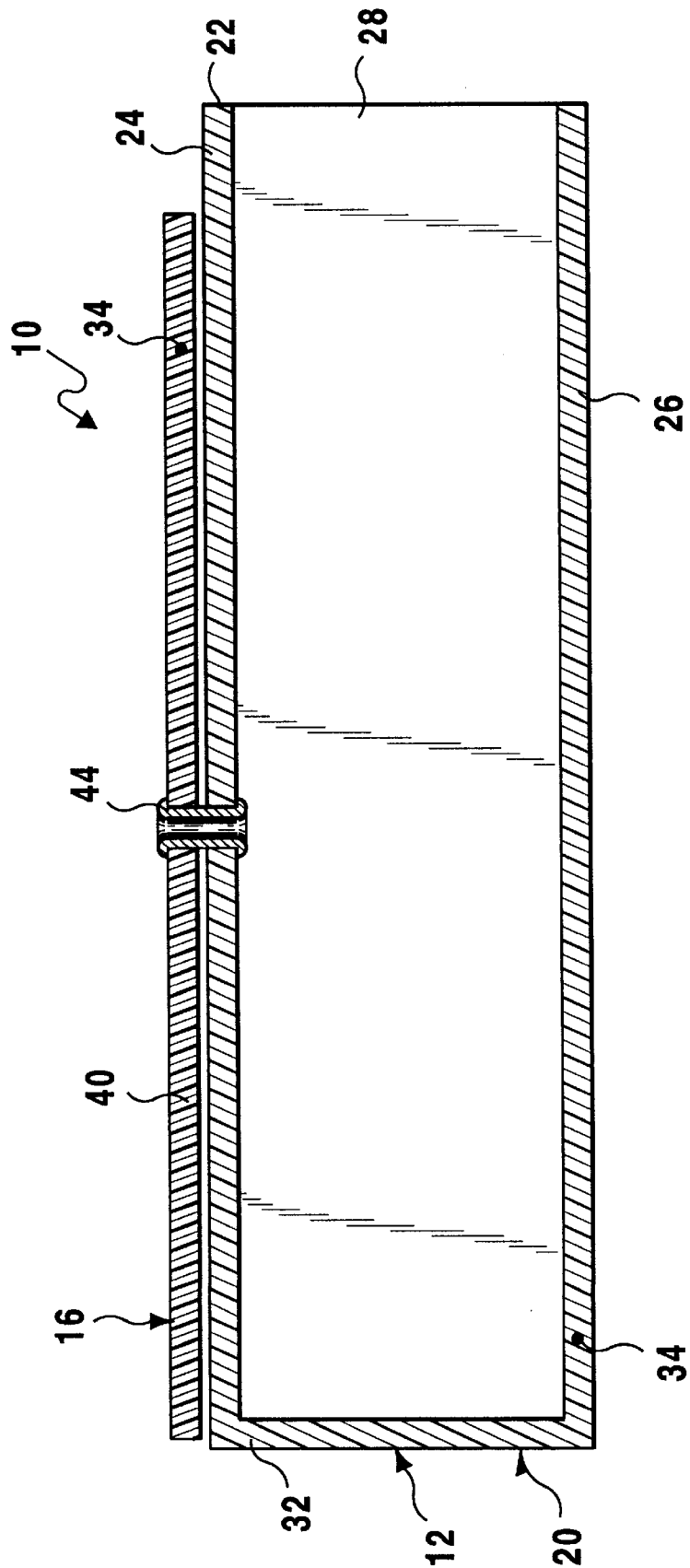
FIG. 9 is a cross sectional view taken along line 9—9 in FIG. 7.

Turning now descriptively to the drawings, in which similar reference characters denote similar elements throughout the several views, FIGS. 1 through 9 illustrate the present invention being a videocassette time measurement device 10. With regard to the reference numerals used, the following numbering is used throughout the various drawing figures.

10 videocassette time measurement device
12 housing structure of 10
14 videocassette
16 time indicating facility of 10
18 tape of 14
20 case for 12
22 rectangular box for 20
24 upper wall of 22
26 lower wall of 26
28 left wall of 26
30 right wall of 26
32 front wall of 26
34 transparent plastic material for 20
36 first set of time scales of 16
38 second set of time scales of 16
40 wheel of 16
42 time scales on 40
44 flanged center collar of 16

The videocassette time measurement device 10 comprises a structure 12 for housing a videocassette 14, so that the videocassette 14 can be freely inserted thereinto and taken out therefrom. A facility 16 is on the housing structure 12, for indicating the amount of time available and used on the tape 18 within the videocassette 14.

The housing structure 12 is a case 20. The case 20 is a rectangular box 22 having five closed sides, wherein a sixth side is opened to receive the videocassette 14. The five closed sides include an upper wall 24, a lower wall 26, a left wall 28, a right wall 30 and a front wall 32. The case 20 is fabricated out of a plastic material 34. The plastic material 34 is transparent.

The time indicating facility 16 in FIGS. 1 through 5, includes two sets of time scales 36 and 38 spaced apart on the upper wall 24 of the rectangular box 22 at the left side and the right side thereof. The first set of time scales 36 at the left side of the upper wall 34 indicates time remaining on the tape 18. The second set of time scales 38 at the left side of the upper wall 34 indicates time used on the tape 18.

The two sets of time scales 36 and 38 can be printed upon the upper wall 24 of the rectangular box 22. The two sets of time scales 36 and 38 can be engraved into the upper wall 24 of the rectangular box 22. The two sets of time scales 36 and 38 can also be embossed onto the upper wall 24 of the rectangular box 22.

In FIGS. 6 through 9, the time indicating facility 16 consists of a wheel 40. Time scales 42 are on the wheel 40. A flanged center collar 44 is between the wheel 40 and the upper wall 22 of the rectangular box 22, to permit the wheel 40 to be rotated in a clockwise and counterclockwise direction until an appropriate tape type and recording method has been selected on the time scales 42.

The wheel 40 is fabricated out of the plastic material 34. The plastic material 34 is transparent. The time scales 42 can be printed upon the wheel 40. The time scales 42 can be engraved into the wheel 40. The time scales 42 can also be embossed onto the wheel 40.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A videocassette time measurement device comprising in combination:

a) a videocassette having a tape dispensing reel and a tape take-up reel;

b) means comprising a transparent rectangular case for housing said videocassette, said videocassette being freely inserted thereinto and taken out therefrom;

c) means mounted on the outside of said transparent case for indicating the amount of time available and used on the tape within the videocassette comprising a wheel having time, tape type and recording method scales thereon, said wheel being mounted over one of said reels with a flanged center collar between said wheel and an upper wall of said case to permit said wheel to be rotated in a clockwise and counterclockwise direction until an appropriate tape type, recording method and time scales have been selected; and d) said wheel and time scales thereon being transparent so that the reel underneath the wheel is visible through said time scales and wheel.

* * * * *